Oct. 23, 1951  W. V. SMITH  2,572,530
TILTABLE CARRIAGE FOR LAWN MOWER SHARPENERS
Filed Nov. 9, 1950  2 SHEETS—SHEET 1

W. V. Smith
INVENTOR
BY *CA Snow & Co.*
ATTORNEYS.

Oct. 23, 1951 W. V. SMITH 2,572,530
TILTABLE CARRIAGE FOR LAWN MOWER SHARPENERS
Filed Nov. 9, 1950 2 SHEETS—SHEET 2
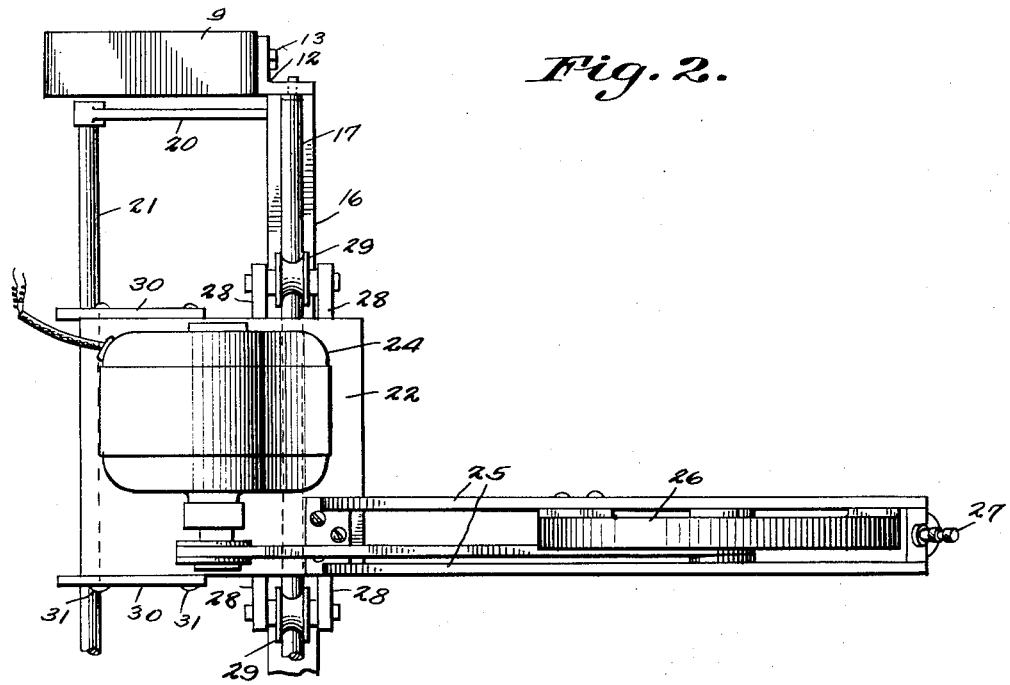
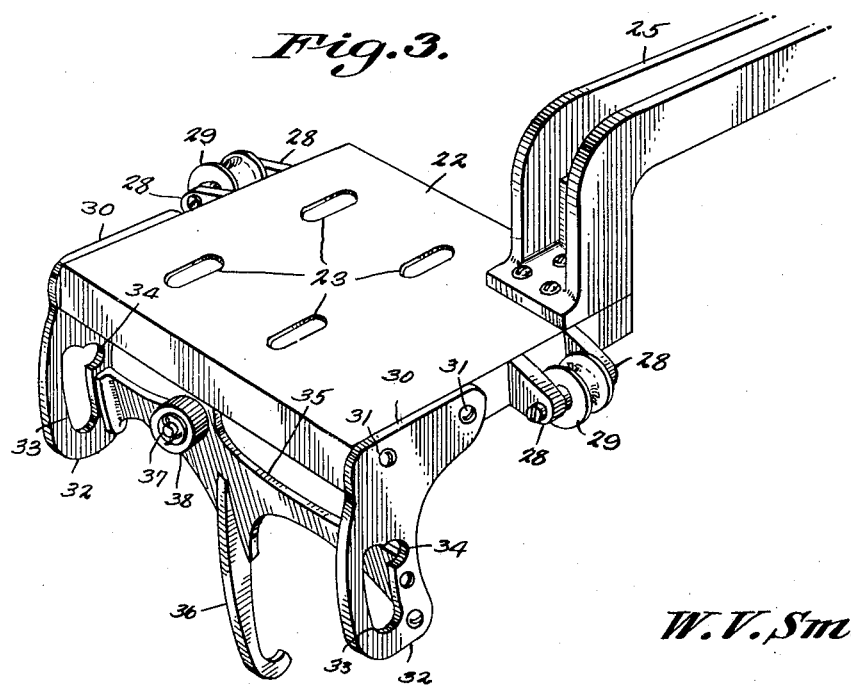
W. V. Smith
INVENTOR
BY
ATTORNEYS.

Patented Oct. 23, 1951

2,572,530

UNITED STATES PATENT OFFICE 2,572,530

TILTABLE CARRIAGE FOR LAWN MOWER SHARPENERS

William V. Smith, Greenville, Ill.

Application November 9, 1950, Serial No. 194,759

3 Claims. (Cl. 51—34)

This invention relates to apparatus or machinery for sharpening lawn mowers, and more particularly, has reference to a tiltable carriage assembly on which is supported the motor and the grinding wheel unit powered thereby.

Lawn mower sharpening apparatus of the general type to which the present invention is particularly well adapted is shown in my Patent No. 2,281,055, issued April 28, 1942. In the use of this apparatus, it is quite usual to utilize a hoist or the like for the purpose of elevating a lawn mower to be sharpened to a proper position in which it may be supported upon the supporting brackets of the apparatus, in position to be sharpened.

The use of this hoisting apparatus makes it desirable to provide as much clear space above and to both sides of the lawn mower to be sharpened as possible, and in this connection, it may additionally be noted that this clear space is also highly desirable because the workman quite often desires to perform other repair or maintenance operations upon the mower apart from the sharpening of the mower blades, and may desire to perform these other operations while the mower is conveniently supported upon the brackets provided for this purpose upon the lawn mower sharpening machine. Still further, it often happens that even during the sharpening operation, the workman will be regularly raising and lowering the grinding wheel assembly, and will do so a considerable number of times during the sharpening operation.

It is, accordingly, the main object of the present invention to provide a tiltable carriage and grinding wheel assembly which is swiftly swingable into operative and inoperative positions respectively, and which, when positioned inoperatively, will be disposed completely out of the way.

Another important object is to provide a tiltable carriage construction as described, wherein the carriage will have a mounting which is quickly shiftable to a lower position in which it locates the grinding wheel operatively for sharpening of a mower blade, an intermediate position in which the grinding wheel is lifted a short distance above and out of contact with the mower blade, and a fully raised position in which the carriage and grinding wheel assembly are disposed completely away from said mower. It is a further important object that in the raised position last-mentioned, the carriage will remain stationary, while being nevertheless adapted in either of the two lower positions for rollable movement longitudinally of the supporting frame.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Fig. 2 is a top plan view of the carriage and of one end of the supporting frame.

Fig. 3 is an enlarged fragmentary perspective view of the carriage alone.

Figure 1:
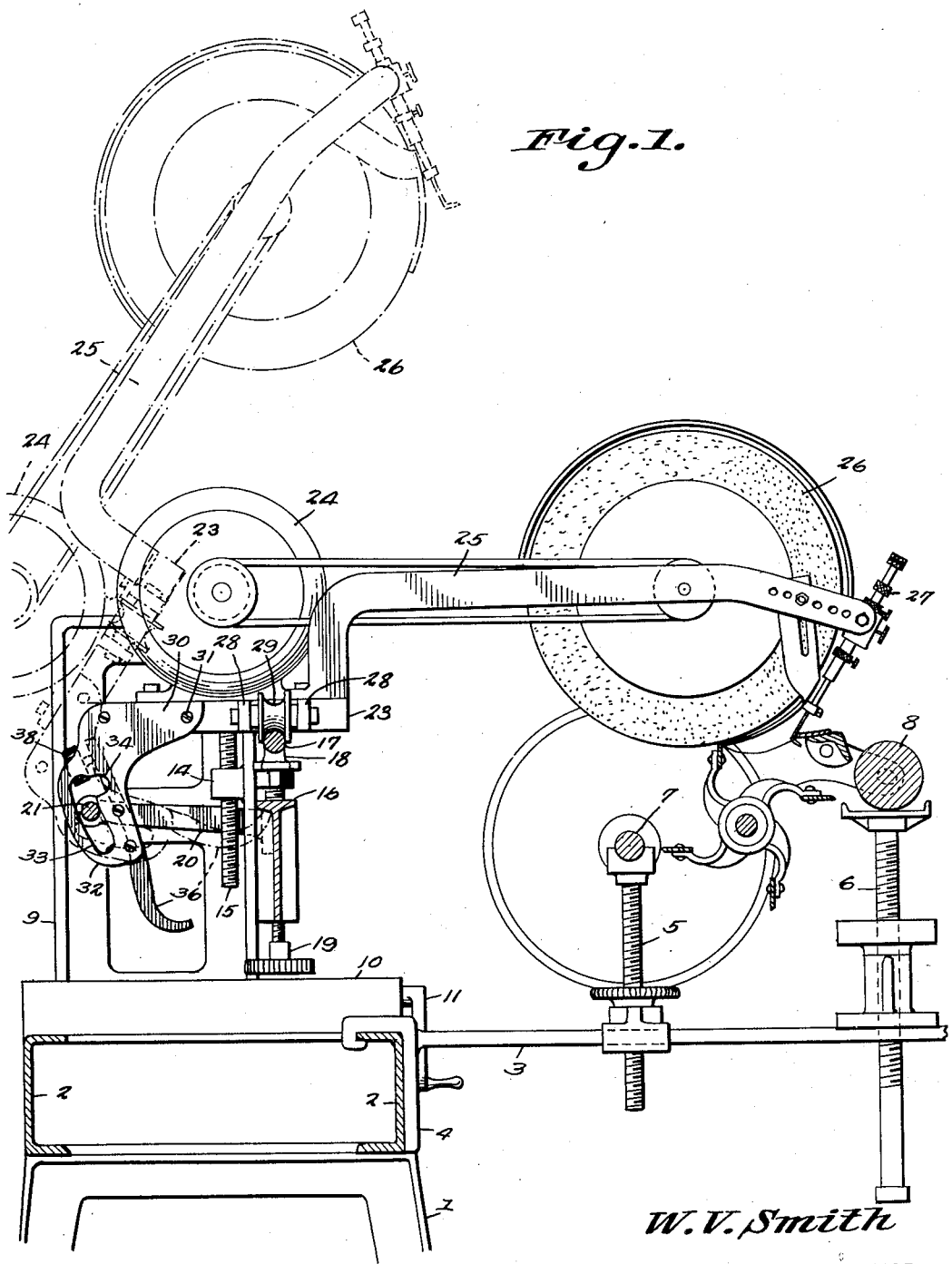
Fig. 1 is a section taken transversely through mower sharpening apparatus of the type stated and through a supported mower to be sharpened, the tiltable carriage and grinding wheel assembly being illustrated in side elevation, said carriage being shown in operative position in full lines and in its "rest" position in dotted lines.

Referring to the drawings in detail, lawn mower sharpening apparatus to which the invention is particularly well suited includes a supporting frame having the legs 1 supporting the rectangular base 2 on which are mounted the parallel brackets 3 extending laterally from the base, said brackets 3 being supported upon foot pieces 4 engaged with the base and shiftable longitudinally of said base, so that the brackets can be located wherever desired and a proper distance apart to accommodate a lawn mower of particular width. The brackets each are provided with vertically adjustable supports 5 and 6 adapted to support the reel shaft 7 and ground roller 8 of a lawn mower to be sharpened.

The apparatus further includes upstanding standards 9 at opposite ends of the supporting frame, these being mounted slidably in guides 10 for adjustment transversely of said ends of the supporting frame, the adjustment being effected by means of screws rotated through the medium of hand cranks 11.

Connected to the respective standards 9 are the angle brackets 12 adjustable vertically of the standards and adapted to be clamped in selected positions to which adjusted by means of clamping elements 13. The vertical adjustment of the angle brackets 12 is provided for by formation of heads 14 upon the clamping elements 13, the heads 14 being threadedly engaged with the adjusting screws 15 manually rotatable by any suitable means. Secured at opposite ends to the respective angle brackets 12 is the elongated supporting bar 16 extending from end to end of the frame, this having upwardly offset ends in which are secured the opposite ends of a bar 17 of circular cross section constituting a track. The bar 17 is capable of being bowed upwardly in its middle by means of a head 18 mounted upon a screw vertically adjustable through the medium of a hand wheel 19 mounted in the bar 16.

All this is illustrated and described in my patent specified above, and does not constitute per se part of the present invention, although illustration of these parts has been desirable for the purpose of showing the exact location and manner of mounting of the tiltable carriage, and the functional characteristics of said carriage.

In accordance with the present invention, I extend rearwardly from opposite ends of the bar 16 supporting arms 20 which are rigidly connected to said bar 16 in any suitable manner. Secured at opposite ends to the arms 20 and disposed parallel to and in a somewhat lower plane than the track 17 is an elongated bar 21 which in one position of the carriage constitutes an auxiliary track, and in another position constitutes a rest or support for the carriage.

Considering the carriage construction, this includes the flat plate 22 having openings 23 through which may be passed fastening elements for mounting upon the carriage of an electric motor 24. Grinding wheel support arms 25 extend laterally from and are rigidly secured to the plate 22, these supporting a grinding wheel 26 which is positioned operatively to the blades to be sharpened, with the aid of an anchor 27. The grinding wheel assembly and anchor are not new per se, and for the purpose of the present invention, it is mainly important to note that said wheel is positioned operatively relative to the mower blades when the carriage is in the full line position illustrated in Fig. 1.

Secured to opposite edges of the plate 22 are pairs of ears 28, these constituting bearing members for rotatable mounting of main rollers 29 concaved correspondingly to the curvature of the track 17, and normally mounted for rollable movement upon said track.

Also secured to opposite side edges of the carriage 22 are plates 30 rigidly connected to the carriage plate 22 by means of fastening elements 31. The plates 30 are integrally formed with depending extensions 32, and these extensions are formed with arcuate slots 33. Spaced closely from the upper ends of the slots 33, and in full communication with the slots, are side recesses 34 proportioned to receive, in one position of the carriage, the supporting bar or auxiliary track member 21.

Secured at opposite ends rigidly to the depending extensions 32 are the opposite ends of a cross bar 35 rigid with a depending hook 36, the hook extending downwardly from the medial portion of said cross bar 35. Also rigidly secured to the medial portion of the cross bar 35 and extending rearwardly therefrom is a stud 37, this stud or spindle constituting a means for rollable mounting of an auxiliary roller 38 upon said cross bar, the roller 38 rolling upon the auxiliary trackway 21 in one position of the carriage as will presently be made apparent.

In use, it will be assumed that the grinding wheel 26 is to be positioned operatively for sharpening of the blades of a lawn mower, and in this position of the carriage and grinding wheel, the parts will appear as in full lines in Fig. 1. It will be noted that in this position the main rollers 29 are in full rollable contact with the main trackway 17. It will be noted, however, that the auxiliary roller 38 is out of contact with the auxiliary track 21, and in fact, in view of the fact that the auxiliary track or supporting bar 21 extends through the medial portions of the elongated slots 33, there is no actual contact between the bar 21 and the carriage. In this position of the carriage, the carriage can be shifted rollably longitudinally of the apparatus, so as to cause the grinding wheel to pass from end to end of the mower blades and thus sharpen the edges of said blades in a manner discussed in detail in my previous patent.

This position can conveniently be termed the lower position of the carriage and is the position in which the carriage is positioned operatively for grinding of the mower blades.

During the grinding operation, as for example, when the wheel 26 has been passed fully to the end of the mower blade and is to be returned to its original position at the other end of said blade, it is desirable to elevate the grinding wheel a short distance, while still permitting the carriage to be given rollable movement so that the carriage and grinding wheel can, as indicated above, be returned to their original position.

To accomplish this, the operator simply elevates the grinding wheel assembly, that is, the arms 25, a short distance. The carriage pivots vertically upon the main track 17, the back end of the carriage, that is, the left hand end in Fig. 1, swinging downwardly until the auxiliary track 21 is engaged by the auxiliary roller 38.

This places the carriage in an intermediate position in which the grinding wheel is elevated slightly out of contact with the mower, and in this intermediate position, the carriage is still rollable longitudinally of the supporting frame, to position the grinding wheel at its initial starting point once again.

Assuming, however, that it is desired to swing the carriage to a wholly inoperative or upper position shown in dotted lines in Fig. 1, the worker simply applies further upward pressure against the grinding wheel end of the carriage, and this causes the main rollers 29 to lift off the track 17. Simultaneously with lifting of the rollers 29 off the track 17, the carriage begins to pivot upon the auxiliary track 21 and as the carriage swings upwardly, the auxiliary track 21 is engaged in the recess 34, with the carriage being pivoted upon said bar 21 until it is in the dotted line position seen in Fig. 1. The motor 24, in this connection, serves as a weight means aiding in the elevation of the carriage to its inoperative or dotted line position.

When dropping the carriage once again to its operative position, the reverse operation takes place, and on pulling downwardly upon the arms 25, the bar 21 is shiftable out of the recess 34 as the rollers 29 come in contact with the main track 17.

The hook 36, as will be noted, normally depends from the carriage and is out of contact with any portion of the apparatus. However, when the carriage is tilted to the dotted line position seen in Fig. 1, the hook 36 will, as readily seen from Fig. 1, engage under the bar 16 so as to limit upward tilting movement of the carriage.

What is claimed is:

1. The combination, with spaced apart main and auxiliary tracks of a lawn mower sharpening machine of a carriage shiftable longitudinally of said tracks, said carriage including main rollers rollably mounted upon the main track, depending plates having slots through which the auxiliary track extends, an auxiliary roller mounted upon the carriage and normally out of contact with the auxiliary track, said carriage being tiltable upon the main track to an intermediate position in which the main and auxiliary rollers are rollably engaged with their respective tracks, and said slots having side recesses adapted to receive said auxiliary track, for pivoting of the carriage upwardly upon the auxiliary track to a raised inoperative position.

2. The combination, with spaced main and auxiliary tracks of a lawn mower sharpening machine, of a carriage mountable upon said tracks, said carriage including a plate overlying the tracks, main rollers carried by said plate and normally having rollable contact with the main track, an auxiliary roller carried by said plate and normally out of contact with said auxiliary track, plates depending from the plate and having slots through which the auxiliary track extends, said slots having side recesses spaced closely from the upper ends of the slots said carriage being tiltable upwardly to a position in which the auxiliary roller is in rollable contact with the auxiliary track, said carriage being tiltable upwardly beyond said position so as to pivot upon said auxiliary track and engage the auxiliary track in said side recesses for swinging of the carriage to a wholly inoperative raised position.

3. The combination, with spaced main and auxiliary tracks of lawn mower sharpening apparatus, the auxiliary track being disposed parallel to the main track and being in a slightly lower plane than the main track, of a carriage mounted upon said tracks, said carriage including a plate extending over the tracks, rollers mounted at opposite sides of said plate, said rollers constituting main rollers and being rollably mounted upon the main track, side plates secured to said plate and depending from the first-named plate, said side plates having arcuate slots, there being side recesses in full communication with said arcuate slots adjacent the upper ends of the slots, the auxiliary track extending through said slots, an auxiliary roller mounted upon the first-named plate, said carriage being swingable to a low position in which the main rollers are in rollable contact with the main track, the auxiliary roller being out of contact with the auxiliary track in said low position of the carriage and said auxiliary track being disposed between opposite ends of the arcuate slot in said low carriage position, the carriage being initially pivotable upon the main track to an intermediate position in which the auxiliary roller is in rollable contact with the auxiliary track, said carriage being adapted to be pivoted vertically and upwardly beyond said intermediate position to elevate the main rollers out of contact with the main track, thus to cause the carriage to pivot upon the auxiliary track, said auxiliary track being shiftable into the side recesses of the slots.

WILLIAM V. SMITH.

No references cited.